United States Patent [19]

Dohi et al.

[11] 3,988,506

[45] Oct. 26, 1976

[54] PROCESS FOR PRODUCING CHLOROPRENE ELASTOMER

[75] Inventors: Michio Dohi; Takuji Sumida; Katsuichi Yokobori, all of Niigata, Japan

[73] Assignee: Denki Kagaku Kogyo Kabushiki Kaisha, Tokyo, Japan

[22] Filed: May 2, 1975

[21] Appl. No.: 574,160

[30] Foreign Application Priority Data

May 2, 1974 Japan.............................. 49-48766

[52] U.S. Cl. ............................ 526/218; 526/224; 526/294
[51] Int. Cl.² ........................................ C08F 236/04
[58] Field of Search ........... 260/80.7; 526/294, 224, 526/218

[56] References Cited
UNITED STATES PATENTS

| | | | |
|---|---|---|---|
| 3,078,247 | 2/1963 | Sinn et al. .......................... | 260/80.7 |
| 3,308,087 | 3/1967 | Garrett............................. | 260/87.5 R |
| 3,310,546 | 3/1967 | Becker............................. | 260/87.5 R |
| 3,311,601 | 3/1967 | Conley............................. | 260/87.5 R |
| 3,833,549 | 9/1974 | Fogg................................ | 260/80.7 |

OTHER PUBLICATIONS

Chem Abs. vol. 75 1971; 65098f Copolymers of Chloroprene Izawa et al.

*Primary Examiner*—Joseph L. Schofer
*Assistant Examiner*—Herbert J. Lilling
*Attorney, Agent, or Firm*—Sughrue, Rothwell, Mion, Zinn and Macpeak

[57] ABSTRACT

A process for producing a chloroprene elastomer, which comprises copolymerizing in the presence of a radical catalyst 80 to 95 parts by weight of 2-chlorobutadiene-1,3 containing less than 0.95% by weight of 1-chlorobutadiene-1,3 with 5 to 20 parts by weight of 2,3-dichlorobutadiene-1,3 at a polymerization temperature of not higher than 20° C in the presence of a mercaptan compound and a process for producing a vulcanized chloroprene rubber.

11 Claims, No Drawings

PROCESS FOR PRODUCING CHLOROPRENE ELASTOMER

BACKGROUND OF THE INVENTION

1. Field of the Invention

The present invention relates to a process for producing a chloroprene elastomer capable of providing a vulcanized chloroprene rubber product having excellent heat aging resistance.

2. Description of the Prior Art

In some uses and under some use conditions, vulcanized rubber products are exposed to the atmosphere at a considerably elevated temperature and usually deteriorate with the lapse of time undergoing a change in properties. The changes depend upon the kind of elastomer used. There are two types of elastomers: one type being the so-called thermosetting type elastomers, the vulcanized products of which harden as the deterioration progresses to become ebonite ultimately; and the other type being the so-called heat-softening type elastomers, the vulcanized products of which soften as the deterioration progresses with deformation occurring. The function as a rubber elastic body is lost with both types of elastomers as a result of such deterioration.

It is desirable, needless to say, for rubber products to maintain an appropriate rubber elasticity at higher temperatures for a long period of time. Such a property is called heat aging resistance, which is one of the fundamental aging-resistance properties required for rubber including weather resistance, oil resistance and ozone resistance. Chloroprene rubber is called a thermo-setting deterioration-type rubber and usually exhibits a tendency toward a reduction in breaking elongation and an increase in hardness with the passage of its period of use with respect to rubber physical properties. The degrees thereof are unavoidably greater than that of main chain-saturated type rubbers such as acryl rubber, epichlorohydrin rubber, polyether rubber, etc., judging from the polymer structure thereof. However, it has been desired to further enhance the heat aging resistance of chloroprene rubber whose processability, vulcanization property, physical property, weather resistance and the like are well balanced.

Evaluation of physical properties of chloroprene rubber can be conducted through the compounding according to JIS K6388, i.e., a so-called gum stock compounding. However, in the production of rubber products, compounding is usually effected in the presence of suitable amounts of compounding chemicals such as carbon black, plasticizer, anti-oxidant, filler, and the like. Thus, the heat aging properties of rubber products are different from each other since the starting rubber, the compounding or the environment of use is different. Therefore, in rating the intrinsic properties of the starting rubber, it is simple and convenient to prepare a vulcanized sheet through an appropriate test compounding and to measure the changes in property under common deterioration conditions.

For the above-described reasons, in the present invention the heat aging resistance is rated according to the following method. That is, a sample of a No. 3 dumb-bell described in JIS K 6301, which is vulcanized from a given test compound, is left in a Geer aging tester for aging. The heat aging resistance is compared in terms of the degree of change in the retention ratio of the breaking elongation to the original value thereof with the lapse of time. With thermosetting deterioration type elastomers such as chloroprene rubber, those which have a greater retention ratio, i.e., a smaller change thereof, are better.

The heat resistance of chloroprene rubber is classified as showing a retention ratio of not less than 50% under the aging conditions of 100° C, 70 hours, e.g., in JIS K 6403. This is not the highest resistant temperature of chloroprene rubber but, in the rubber industry, a temperature of 120° C is commonly taken as a limit. Improvement of the heat resistance through compounding of rubber is described in, e.g., Kanenari Goda, *Chloroprene Rubber*, p. 45, Taiseisha, (1972). It is considered that improvement in the property of the polymer itself will lead to further improvement in the heat aging resistance with the help of improvement in the compounding. However, in conventional investigations on the production of chloroprene rubber, there are known no reports which suggest improvement of the heat resistance of the polymer itself under severe aging conditions.

SUMMARY OF THE INVENTION

As a result of examining the effect of polymer production conditions on heat resistance, it has now been discovered that a polymer produced under the specific conditions to be described hereinafter possesses a markedly improved heat resistance, thus achieving the present invention.

An object of the present invention is to provide a chloroprene elastomer having excellent heat aging resistance and, more particularly, to provide a process for producing such an elastomer and a process for producing a vulcanized chloroprene rubber capable of being prepared from the elastomer and having excellent heat aging resistance.

Accordingly the process of the present invention comprises copolymerizing in the presence of a radical catalyst 80 to 95 parts by weight of 2-chlorobutadiene-1,3 (hereinafter abbreviated as chloroprene) containing less than 0.95% by weight, preferably not more than 0.5% by weight, of 1-chlorobutadiene-1,3 (hereinafter abbreviated as 1-chloroprene) and 5 to 20 parts by weight of 2,3-dichlorobutadiene-1,3 (hereinafter abbreviated as dichlorobutadiene) at a temperature of not higher than 20° C, preferably not higher than 10° C, more preferably not higher than 5° C, in the presence of a mercaptan compound as a molecular weight-modifying agent.

DETAILED DESCRIPTION OF THE INVENTION

The vulcanized rubber products obtained from the resulting polymer produced by the process of this invention exhibit quite excellent heat resistance, suitable cold-resistance and excellent tensile properties as compared with vulcanized rubber products obtained from any type of commercially available conventional chloroprene elastomers using the same compounding. In particular, the tear resistance is improved, which is an additional advantage of the present invention.

The heat resistance of a starting rubber can be even further improved by selecting appropriate compounding chemicals, in particular, the aging inhibitor. The excellent properties of the polymer of the present invention are definitely exhibited with the thus-improved rubber compound. It is clear that the advantages of the present invention lie in this point.

The process of the present invention will be described in detail below.

In order to attain the objects of the present invention, the monomer composition to be used is one important condition. That is, it is necessary to use a mixture of 80 to 95 parts by weight of chloroprene containing less than 0.95% by weight, preferably not more than 0.5% by weight, of 1-chloroprene and 5 to 20 parts by weight of dichlorobutadiene. The chloroprene for the polymerization can be chloroprene which is in general industrially available with a purity of not less than about 98%. It is difficult to completely control the formation of 1-chloroprene, one main impurity, using either of the so-called acetylene process or the butadiene process. 1-Chloroprene is believed to exert a very serious detrimental influence on the heat aging property since it forms a structure containing an allylic active chlorine when involved in a polymer structure through a 1,4-linkage. In another connection structure too, 1-chloroprene results in a structure disadvantageous from the standpoint of heat aging resistance. Therefore, the lower is the content of 1-chloroprene in the chloroprene, the better are the results. However, since the polymerization activity of 1-chloroprene is lower than that of chloroprene, in fact, contamination of 1-chloroprene in an amount of less than 0.95% does not affect the excellent property achieved in the present invention.

Separation of 1-chloroprene from chloroprene through distillation is possible in principle. However, since their boiling points are only slightly different from each other, purification of chloroprene monomer to a degree such that the contamination of 1-chloroprene is not more than 0.1%, i.e., to a substantially pure degree, necessitates a large distilling apparatus, which results in unfavorable polymerization difficulty during purification, and thus is economically disadvantageous.

Dichlorobutadiene, selected as the ingredient copolymerizable with chloroprene, is easily copolymerized with chloroprene and is one of the monomers used for preventing crystallization of chloroprene rubber. However, it has not been recognized that polymers obtained by copolymerizing a suitable amount of dichlorobutadiene under specific polymerization conditions as in the present invention exhibit improved heat resistance under severe use conditions. It is believed that this is attributed to the chemical stabilization of the double bond itself or adjacent active methylene structure, since two chlorine atoms are symmetrically connected to the remaining double bond of the dichlorobutadiene unit included in the polymer. Therefore, when the content of the dichlorobutadiene in the monomer mixture is less than 5% by weight, the effect thereof on not only the heat resistance but the prevention of crystallization as well is insufficient. On the other hand, when the content of the dichlorobutadiene is more than 20% by weight, the resulting polymer shows reduced rubber elasticity reflecting the property of the dichlorobutadiene units, and the vulcanization rate is reduced so much, due to the stability of the polymer, that practical elastomer products are obtained with difficulty. Therefore, a content less than 5% by weight or more than 20% by weight is not preferred.

Another condition of the present invention is the polymerization temperature. The temperature is necessarily not higher than 20° C, preferably not higher than 10° C and, more preferably, not higher than 5° C. It is believed that low temperature polymerization serves to reduce polymer branching and to provide a highly regular structure, thus reducing the labile portions for aging. Therefore, it is expected that, the lower the temperature is, the better would be the resulting properties. However, in radical polymerization, the polymerization rate is greatly influenced by the polymerization temperature, and hence too low a temperature is not advantageous, and a temperature of about −20° C is a generally employed lower limit on consideration of this factor.

The internal structure of the polymer can be controlled in favor of heat aging resistance by controlling the factors of monomer composition and polymerization temperature, taking the terminal structure into consideration. The terminal structure of polychloroprene is mostly governed by the chain transfer agent used upon polymerization.

Generally, chain transfer agents in the polymerization of chloroprene are exemplified by mercaptan compounds, dialkylxanthogendisulfides, and the like as disclosed in U.S. Pat. Nos. 2,567,117 and 3,378,538. Of these, the heat resistance of a polymer prepared by using dialkylxanthogendisulfides, e.g., diisopropylxanthogendisulfide, is found to be poor. In the present invention, aliphatic mercaptans such as n-dodecylmercaptan, t-dodecylmercaptan, etc., and aromatic mercaptans such as thiophenol, thioxylenol, etc., are preferred chain transfer agents. These chain transfer agents are usually used in an amount of about 0.05 to 2.0 parts by weight per 100 parts by weight of the total amount of monomer, i.e., the amount of the dichlorobutadiene and the chloroprene, although the amount varies depending upon the molecular weight of the polymer to be produced.

In order to produce chloroprene elastomer according to the present invention, it is necessary to satisfy all the above-described conditions with respect to monomer composition, polymerization temperature and the chain transfer agent. If any of these conditions is not satisfied, the intended heat resistance cannot be obtained.

Japanese Patent Publication No. 7,271/1971 is an example of a disclosure of analogous production conditions to the present invention. However, this disclosure is absolutely different from the present invention in object, structure and effect. That is, in Japanese Patent Publication No. 7,271/1971, a mixture comprising 1 to 30 parts of 1-chloroprene, 1 to 30 parts of dichlorobutadiene and 100 parts of chloroprene is polymerized for the purpose of improving the low temperature properties of the polymer. However, Japanese Patent Publication No. 7,271/1971 discloses that the polymerization temperature ranges from 10° to 60° C, preferably 30° to 50° C, and there is no disclosure that when the polymerization temperature is not higher than 20° C, a copolymer which is especially very stable to aging is obtained. On the other hand, in the present invention, the intention is to improve the heat aging property of the polymer under severe conditions by specially specifying the amount of 1-chloroprene and the polymerization temperature. Japanese Patent Publication No. 7,271/1971 does not suggest such property at all. Also, in the present invention, the incorporation of 1-chloroprene in an amount of as much as 1 to 30 parts must be avoided since 1-chloroprene detrimentally influences the heat aging property.

The copolymerization of the present invention can be conducted according to known processes such as solution polymerization or emulsion polymerization in the presence of a radical catalyst, with emulsion polymerization being preferable. A water-soluble salt of disproportionated rosin acid is mainly used as an emulsifying agent for emulsion polymerization. Also, other surface active agents such as aliphatic carboxylates, anionic surface active agents represented by the water-soluble salts of alkyl sulfates, alkylbenzenesulfonates, sodium naphthalenesulfonateformaldehyde adducts, etc., and nonionic surface active agents represented by polyoxyphenylene alkylphenol ethers, etc., can be used individually or in combination or, further, in combination with a disproportionated rosin acid salt.

Any water-soluble catalysts (e.g., potassium persulfate, ammonium persulfate, hydrogen peroxide, t-butylhydroperoxide, etc.) and oil-soluble catalysts (e.g., azobisisobutyronitrile, benzoyl peroxide, cumene hydroperoxide, p-menthane hydroperoxide, diisopropyl peroxydicarbonate, etc.) can be used as a radical catalyst. A suitable amount of the radical catalyst which can be employed ranges from about 0.001 to 0.2% by weight based on the total amount of monomers. Where the polymerization rate is slow due to a low polymerization temperature, it is desirable to use a reducing agent with the catalysts, i.e., a so-called redox catalyst system. As the redox catalyst system, sulfoxylate formulation and peroxamine formulation (e.g., Kanbara et al., Ed., *Synthetic Rubber Handbook*, p. 177, Asakura Shoten (1967)) are typical examples, but other redox systems can also be employed. Where emulsion polymerization is to be conducted at a temperature of 0° C or less, the addition of an anti-freezing agent is necessary. The use of water-soluble alcohols such as methanol, ethylene glycol, etc., does not affect the polymerization or the physical properties.

Mercaptan compounds are used as a chain transfer agent. The total amount of the chain transfer agent is added upon initiation of polymerization or, in some cases, it is effective for heat resistance to add the chain transfer agent incrementally during the polymerization or to additionally add the chain transfer agent to an emulsion after the completion of the polymerization and before the isolation of the resulting polymer. The amount of chain transfer agents which can be employed varies depending upon the moleclar weight of the polymer produced. A suitable amount of the chain transfer agents generally ranges from 0.05 to 2% by weight based on the total amount of monomers, i.e., the dichlorobutadiene and the chloroprene.

Suitable examples of solvents which can be employed for the solution or emulsion polymerization include benzene, toluene, xylene, ethyl benzene, isopropyl benzene, carbon tetrachloride, chloroform, 1,1-dichloroethane, 1,2-dichloroethane, 1,1,1-trichloroethane, 1,1,2-trichloroethane, 1,1,1,2-tetrachloroethane, 1,2-dibromoethane, tetrahydrofuran, dioxane, carbon disulfide and the like. A suitable concentration range which can be employed in the polymerization ranges from about 20 to 200 parts by weight per the total amount of monomers. In addition, a suitable polymerization time which can be employed can range from about 3 to 20 hours, and a suitable amount of emulsifying agent which can be employed ranges from about 1 to 10% by weight based on the total amount of monomers. Further, suitable emulsion polymerization techniques are disclosed in detail in U.S. Pat. No. 2,576,009.

The polymerization conversion of the monomers is preferably not less than 60% for economical reasons which, however, is not an essential condition. However, if conversion is increased too high, a branch structure develops in the resulting polymer with the heat aging resistance being deteriorated. Therefore, a conversion of more than 90% should be avoided. The polymerization can be stopped by adding a short-stopping agent. Thiodiphenylamine, p-t-butylcatechol, hydroquinone, sodium diethyldithiocarbamate, diethylhydroxylamine, etc., can be used in a proportion of about 0.001 to 1% based on the unreacted monomer as a short-stopping agent.

The chloroprene elastomer in accordance with the present invention possesses a good storage stability. It is useful for the objects of the present invention to incorporate a small amount of a stabilizing agent in the polymer. Examples of stabilizing agents which can be used include amine compounds such as phenyl-$\beta$-naphthylamine, N,N-diphenyl-p-phenylenediamine, the reaction product between diphenylamine and diisobutylene, etc.; phenolic compounds such as 2,5-di-t-butylhydroquinone, 2,6-di-t-butyl-p-cresol, 2,2'-methylenebis(4-methyl-6-t-butylphenol), 4,4'-thiobis-6-t-butyl-3-methylphenol, etc.; sulfur-containing compounds such as nickel dibutyldithiocarbamate, tetraethylthiuram disulfide, etc.; the so-called epoxy compounds containing an oxirane oxygen such as epoxydized soybean oil, epoxydized butyl oleate, the reaction product between bisphenol A and epichlorohydrin, etc.; phosphorus-containing organic compounds such as tri-n-butyl phosphite, tri(nonylphenyl)-phosphite, etc., and the like. The amount of these stabilizing agents used can range from about 0.01 to 20% by weight based on the polymer. These stabilizing agents can be used individually or in combination, and are added, at the latest, in the emulsion stage or at the step of isolating the polymer.

Unreacted monomers after polymerization can be removed and recovered according to known processes such as steam-stripping under reduced pressure, e.g., as disclosed in U.S. Pat. No. 2,467,769.

The resulting polymer is isolated and dried according to known processes such as a drum drier process, a freeze roll drying process, etc., as disclosed in U.S. Pat. Nos. 2,187,146 and 2,914,497.

The chloroprene elastomer in accordance with the present invention possesses a good vulcanization property. However, in order to further improve extrusion processability and sheet smoothness, it is an advantageous modification process to admix the elastomer with a gel polymer. Gel polymers which can be used are those obtained by the emulsion polymerization of chloroprene monomer in the presence of a multi-functional monomer such as ethylene glycol dimethacrylate, trimethylolpropane trimethacrylate, tetramethylolmethane tetramethacrylate, etc., as described in British Patent 1,237,750 content of 1-chloroprene in chloroprene (percent by weight) and U.S. Pat. No. 3,849,519 (corresponding to Japanese Patent Application (OPI) No. 22,444/1974), although suitable gel polymers are not limited to only these examples. The polymer of the present invention and this gel polymer are admixed prior to the step of isolating the polymer. The content of the gel polymer can range from about 5 to 50% based on the polymer mixture. Such a composition possesses preferred properties. For example, not only extrusion processability but permanent strain property as well are improved while excellent heat resistance is maintained.

The fact that the heat aging resistance of the polymer of the invention is not affected by the addition of the gel polymer may be as follows. Since the so-called microgels of the highly cross-linked structure are in a microscopically dispersed state in the polymer of the present invention, the microgels scarcely affect the vulcanization state or heat resistance of the polymer of the present invention. Also, the improvement of processability may be attributed to the thixotropy property of the compound of this composition.

The chloroprene polymers or copolymers generally have excellent physical properties, chemical properties and the like, such as weather-resistance, oil-resistance, solvent-resistance, grease-resistance, flame-retardancy, aging resistance and the like, and also are elastic bodies having an excellent film strength applicable to a wide range of utility.

In order to obtain useful rubber products from the polymer of the present invention, compounding chemicals are admixed with the polymers, followed by molding and vulcanization. The compounding of the rubber varies depending upon the properties required for the products. Any materials usually used for compounding chloroprene rubber can be employed and suitable examples thereof are described in, e.g., Murray and Thompson, *The Neoprene*, E. I. du Pont, (1963).

The conventional compounding art can be employed. For example, as a compounding agent, a filler, a reinforcing agent, a plasticizer, a vulcanizing agent and a vulcanization accelerator can be used.

Any vulcanization process usually employed for the molding of chloroprene rubber can be employed and suitable parameters therefor are described in Murray and Thompson, supra.

The present invention will now be illustrated in greater detail by reference to the following non-limiting examples of preferred embodiments of the present invention. Unless otherwise indicated herein, all parts, percents, ratios and the like are by weight.

EXAMPLES 1 – 5

Production of Polymer 10 kg in total of monomers of the following formulation were polymerized at given temperatures in a nitrogen stream using a 30 liter stainless steel polymerization reactor.

When the conversion reached 70%, an emulsion containing 1.2 g of thiodiphenylamine and 1.2 g of p-t-butylcatechol was added thereto to stop the polymerization.

Furthermore, a stabilizing agent containing 6 g of epoxydized soybean oil and 6 g of 2,2'-methylenebis-4-methyl-6-t-butylphenol was emulsified and added thereto. The unreacted monomer was removed by steam stripping, and the resulting latex was subjected to a conventional freeze roll drying to isolate the dry polymer.

|  | parts |
|---|---|
| Chloroprene | See Table 1 |
| Dichlorobutadiene | " |
| Water | 150 |
| Methanol | 20 |
| Disproportionated Rosin Acid | 4.0 |
| Potassium Hydroxide | 1.0 |
| Sodium Salt of Naphthalenesulfonic Acid-Formaldehyde Condensate | 0.80 |
| Ferrous Sulfate | 0.05 |
| Tetrasodium Ethylenediaminetetraacetate | 0.05 |
| Sodium Formaldehydesulfoxylate | 0.20 |
| Potassium Chloride | 0.50 |
| n-Dodecylmercaptan | 0.15 |
| Diisopropylbenzene Hydroperoxide | 0.20 |

The polymerization conditions in detail and the results obtained are shown in Table 1.

TABLE 1

| Item | | Polymer | | | | | | | |
|---|---|---|---|---|---|---|---|---|---|
| | | Ex.1 | Ex.2 | Ex.3 | Ex.4 | Ex.5 | Comp. Ex.1 | Comp. Ex.2 | Comp. Ex.3 |
| Polymerization Conditions | Chloroprene (parts) | 85 | 90 | 94 | 90 | 90 | 90 | 94 | 85 |
| | Content of 1-Chloroprene in Chloroprene (percent by weight) | 0.6 | 0.6 | 0.6 | 0.4 | 0.4 | 0.4 | 2.0 | 2.0 |
| | Dichlorobutadiene (parts) | 15 | 10 | 6 | 10 | 10 | 10 | 6 | 15 |
| | Polymerization Temperature (°C) | 10 | 10 | 10 | 0 | −10 | 40 | 10 | 10 |
| Results of Polymerization | Polymerization Time (min) | 290 | 330 | 350 | 400 | 470 | 260 | 310 | 270 |
| | Polymerization Ratio (%) | 66 | 71 | 68 | 67 | 68 | 63 | 66 | 70 |
| | Mooney Viscosity (ML 1+4, 100° C) | 82 | 94 | 85 | 79 | 73 | 86 | 83 | 86 |

Properties of Gum Stock Compound

The polymers obtained in Examples 1 to 5 and Comparative Examples 1 to 3 under the conditions set forth in Table 1 were subjected to press vulcanization for 30 minutes at 150° C employing the compounding of JIS K 6388–66, and the physical properties thereof were measured according to JIS K 6301. The results thus obtained are shown in Table 2.

Aging was effected by leaving the samples in a Geer aging tester at 130° C for 4 days or 8 days.

the physical properties were about the same as or somewhat inferior to that of the commercially available product.

Physical Properties of Carbon Compound

The physical properties of the samples obtained by vulcanizing the compounding of the following formulation wherein the polymers of Examples 1 to 5 and Comparative Examples 1 to 3, which were obtained under the conditions shown in Table 1, were used and wherein carbon black was present as a filler were measured. The results obtained are shown in Table 3. Additionally, vulcanization was effected using press vulcanization for 30 minutes at 150° C. Aging was effected by leaving the vulcanizate in a Geer aging tester at 130° C for 4 days or 8 days.

TABLE 2

| Evaluation | | | Polymer | | | | | | | |
|---|---|---|---|---|---|---|---|---|---|---|
| | | Ex.1 | Ex.2 | Ex.3 | Ex.4 | Ex.5 | Comp. Ex.1 | Comp. Ex.2 | Comp. Ex.3 | Commercial Product* |
| Normal Physical Property | | | | | | | | | | |
| 500% Modulus (kg/cm$^2$) | | 30 | 32 | 37 | 36 | 39 | 29 | 31 | 33 | 29 |
| Tensile Strength (kg/cm$^2$) | | 180 | 210 | 230 | 250 | 250 | 200 | 220 | 160 | 180 |
| Elongation (%) | | 850 | 840 | 860 | 880 | 880 | 840 | 860 | 840 | 830 |
| Tear Strength (kg/cm) (Model A) | | 31 | 33 | 34 | 36 | 36 | 27 | 30 | 27 | 28 |
| Hardness (Model C-spring type) | | 42 | 46 | 46 | 45 | 47 | 45 | 46 | 45 | 43 |
| Physical Property after Aging | | | | | | | | | | |
| Tensile Strength Retention Ratio (%) | 4** | 48 | 40 | 62 | 67 | 85 | 30 | 25 | 33 | 22 |
| | 8 | 19 | 19 | 20 | 21 | 22 | 18 | 18 | 16 | 17 |
| Elongation Retention Ratio (%) | 4 | 47 | 49 | 58 | 55 | 66 | 31 | 40 | 36 | 34 |
| | 8 | 24 | 22 | 30 | 28 | 32 | 14 | 18 | 16 | 16 |

*Denka Chloroprene S-40
**Days aged

| Compounding | parts |
|---|---|
| Polymer | 100 |
| Phenyl-α-naphthylamine | 1 |
| Magnesia | 4 |
| Zinc Oxide | 5 |
| 2-Mercaptoimidazoline | 0.35 |

It is clear that the polymers obtained according to the process of the present invention are not inferior to the commercially available polymer (Denka Chloroprene S-40, trade name, made by Denki Kagaku Kogyo Kabushiki Kaisha) in normal physical properties and, in addition, exhibit sufficient superiority in heat aging resistance, in particular, elongation retention, under quite severe aging conditions. With the Comparative Examples outside the scope of the present invention,

| Compounding | parts |
|---|---|
| Polymer | 100 |
| Phenyl-α-naphthylamine | 1 |
| Magnesia | 4 |
| SRF Carbon Black | 30 |
| Zinc Oxide | 5 |
| 2-Mercaptoimidazoline | 0.35 |

TABLE 3

| Item | | | | | polymer | | | | | |
|---|---|---|---|---|---|---|---|---|---|---|
| | | Ex.1 | Ex.2 | Ex.3 | Ex.4 | Ex.5 | Comp. Ex.1 | Comp. Ex.2 | Comp. Ex.3 | Commercial Product* |
| Normal Physical Property | 200% Modulus | 70 | 73 | 63 | 70 | 70 | 63 | 75 | 72 | 68 |

TABLE 3-continued

| Item | | | Ex. 1 | Ex.2 | Ex.3 | Ex.4 | Ex.5 | Comp. Ex.1 | Comp. Ex.2 | Comp. Ex.3 | Commercial Product* |
|---|---|---|---|---|---|---|---|---|---|---|---|
| | (kg/cm$^2$) Tensile Strength (kg/cm$^2$) | | 240 | 280 | 260 | 270 | 280 | 240 | 250 | 210 | 240 |
| | Elongation (%) | | 500 | 490 | 480 | 500 | 510 | 480 | 470 | 480 | 490 |
| | Tear Strength (kg/cm) (JIS Model A) | | 59 | 62 | 62 | 64 | 66 | 52 | 57 | 54 | 55 |
| | Hardness (JIS C) | | 61 | 63 | 63 | 62 | 60 | 63 | 65 | 64 | 62 |
| Physical Property after Aging | Tensile Strength Retention Ratio (%) | 4** | 84 | 82 | 77 | 80 | 79 | 80 | 76 | 82 | 75 |
| | | 8 | 70 | 69 | 64 | 68 | 67 | 69 | 64 | 69 | 68 |
| | Elongation Retention Ratio (%) | 4 | 61 | 62 | 60 | 66 | 69 | 52 | 55 | 48 | 50 |
| | | 8 | 33 | 37 | 35 | 40 | 42 | 28 | 30 | 23 | 24 |

*Denka Chloroprene M-100
**Days aged

The polymers obtained according to the process of the invention are excellent, even in the presence of the filler, in normal physical properties and aged physical properties, particularly in the elongation retention ratio after heat aging, as compared with the commercially available polymer. The polymers of the Comparative Examples are about the same as or inferior to the commercially available product (Denka Chloroprene M-100, trade name, made by Denki Kagaku Kogyo Kabushiki Kaisha).

Physical Properties of Carbon and Oil Filled Compound

The properties of vulcanized rubber products vary considerably depending upon the compounding used. In particular, an anti-oxidant and a plasticizer are said to greatly influence the heat stability.

In order to clarify the characteristics of the polymers of the present invention, the following typical compounding was selected and the results obtained by measuring the physical properties are shown in Table 4. Additionally, vulcanization was effected by press vulcanization at 150° C for 30 minutes. The aging test was conducted by leaving the vulcanizate in a Geer aging tester at 130° C for 4 days, 8 days or 12 days.

| Compounding | parts |
|---|---|
| Polymer | 100 |
| Stearic Acid | 0.5 |
| Octamine (reaction product between diphenylamine and diisobutylene, made by Uniroyal Chem., U.S.A.) | 4 |
| Aranox (p-(p-tolylsulfonylamido)-diphenylamine, made by Uniroyal Chem., U.S.A.) | 1 |
| Magnesia | 4 |
| FEF Carbon (Asahi No. 60, made by Asahi Carbon Co.) | 40 |
| Vinicizer No. 20 (ditridecyl phthalate, made by Kao Soap Co., Ltd.) | 10 |
| 2-Mercaptoimidazoline | 0.5 |
| zinc oxide | 5 |

TABLE 4

| Item | | Ex.1 | Ex.2 | Ex.3 | Ex.4 | Ex.5 | Comp. Ex.1 | Comp. Ex.2 | Comp. Ex.3 | Commercial Product* |
|---|---|---|---|---|---|---|---|---|---|---|
| Normal Physical Property | 200% Modulus (%) | 78 | 75 | 76 | 77 | 74 | 76 | 77 | 79 | 74 |
| | Tensile Strength (kg/cm$^2$) | 210 | 220 | 230 | 220 | 230 | 210 | 220 | 210 | 220 |
| | Elongation (%) | 480 | 500 | 520 | 540 | 560 | 460 | 470 | 490 | 470 |
| | Tear Strength | | | | | | | | | |

TABLE 4-continued

| Item | | | Ex.1 | Ex.2 | Ex.3 | Ex.4 | Ex.5 | Comp. Ex.1 | Comp. Ex.2 | Comp. Ex.3 | Commercial Product* |
|---|---|---|---|---|---|---|---|---|---|---|---|
| Physical Property after Aging | (kg/cm) (JIS Model A) | | 48 | 48 | 50 | 52 | 55 | 42 | 46 | 45 | 43 |
| | Hardness HS (JiS C) | | 62 | 64 | 62 | 44 | 63 | 66 | 64 | 61 | 63 |
| | Tensile Strength Retention Ratio (%) | 4** | 79 | 87 | 88 | 81 | 84 | 81 | 83 | 83 | 82 |
| | | 8 | 78 | 80 | 83 | 79 | 82 | 80 | 80 | 81 | 80 |
| | | 12 | 78 | 76 | 80 | 77 | 76 | 80 | 79 | 80 | 79 |
| | Elongation Retention Ratio (%) | 4 | 60 | 62 | 57 | 60 | 58 | 45 | 50 | 49 | 46 |
| | | 8 | 40 | 45 | 42 | 46 | 48 | 30 | 36 | 34 | 32 |
| | | 12 | 24 | 23 | 20 | 23 | 25 | 16 | 19 | 17 | 16 |

*Denka Chloroprene M-100
**Days aged

The polymers obtained according to the process of the present invention exhibit good properties in normal and aged physical properties as compared with the commercially available polymer even in the carbon and oil filled compound containing an aging inhibitor and carbon black. In contrast, the polymers of the Comparative Examples exhibit about the same or inferior properties as compared with the commercially available product.

EXAMPLES 6 – 8

The following tests were conducted in order to clarify the influence of a chain transfer agent on heat resistance.

Production of Polymer 10 kg in total of monomers of the following formulation was polymerized at 10° C in a nitrogen stream using a 30 liter stainless steel polymerization reactor.

When the conversion reached 70%, an emulsion containing 1.2 g of diethylhydroxylamine and 1.2 g of tetraethylthiuram disulfide was added thereto to stop the polymerization.

Further, a stabilizing agent emulsion containing 3.5 g of the reaction product between bisphenol A and epichlorohydrin and 3.5 g of 2,2'-methylenebis-4-methyl-6-butylphenol was added thereto, followed by removing the unreacted monomer by steam stripping. The resulting latex was subjected to a conventional freeze roll drying to isolate the dry polymer.

| | parts |
|---|---|
| Chloroprene | 90 |
| Dichlorobutadiene | 10 |
| Water | 150 |
| Disproportionated Rosin Acid | 4.0 |
| Sodium Hydroxide | 0.80 |
| Sodium Salt of Naphthalenesulfonic Acid-Formaldehyde Condensate | 0.80 |
| Sodium Bisulfite | 0.30 |
| Chain Transfer Agent | shown in Table 5 |
| Polymerization Catalyst* | |

*Aqueous solution containing 2% potassium persulfate and 0.1% sodium anthraquinone-β-sulfonate The 1-chloroprene content in the chloroprene monomer used was 0.45% and an appropriate amount of the catalyst solution was successively added so as to keep the polymerization rate constant.

The results of the polymerization are shown in Table 5.

TABLE 5

| Polymerization | | Ex.6 | Ex.7 | Ex.8 | Comp.Ex.4 |
|---|---|---|---|---|---|
| Chain Transfer Agent | Agent | n-Dodecyl-mercaptan | t-Dodecyl-mercaptan | Thio-phenol | Diisopropyl xanthogen-disulfide |
| | Amount used (% based on total monomer amount) | 0.17 | 0.45 | 0.33 | 0.48 |
| Polymerization Results | Polymerization Time (min) | 320 | 300 | 370 | 260 |
| | Polymerization Rate (%) | 72 | 70 | 73 | 69 |
| | Mooney | | | | |

TABLE 5-continued

| Polymerization | Example | | | |
|---|---|---|---|---|
| | Ex.6 | Ex.7 | Ex.8 | Comp.Ex.4 |
| Viscosity (ML 1+4, 100° C) | 80 | 77 | 90 | 74 |

Physical Property of Carbon Compound

The physical properties of the samples obtained by compounding the polymers of Examples 6 to 8 and Comparative Example 4 prepared under the conditions shown in Table 5 according to Table 3 and vulcanizing are shown in Table 6. The vulcanization was effected for 30 minutes using a press at 150° C.

The aging was effected at 130° C for 4 days or 8 days using a Geer aging tester.

TABLE 6

| Item | | | Polymer | | | |
|---|---|---|---|---|---|---|
| | | | Ex.6 | Ex.7 | Ex.8 | Comp. Ex.4 | Commercial Product (Denka Chloroprene M-100) |
| Normal Physical Property | 200 % Modulus (%) | | 75 | 77 | 77 | 81 | 78 |
| | Tensile Strength (kg/cm$^2$) | | 260 | 270 | 260 | 280 | 250 |
| | Elongation (%) | | 540 | 520 | 540 | 510 | 500 |
| | Tear Strength (kg/cm) | | 60 | 58 | 58 | 68 | 54 |
| | Hardness (JIS) | | 60 | 63 | 62 | 63 | 61 |
| Physical Property after Aging | Tensile Strength Retention Ratio (%) | 4* | 80 | 81 | 78 | 75 | 77 |
| | | 8 | 68 | 72 | 70 | 70 | 71 |
| | Elongation Retention Ratio (%) | 4 | 60 | 63 | 59 | 48 | 53 |
| | | 8 | 34 | 35 | 32 | 18 | 26 |

*Days aged

The polymers obtained according to the process of the present invention exhibit excellent properties, even in the presence of the filler, in normal and aged physical properties as compared with the commercially available polymer. In contrast, the polymer of Comparative Example 4 is clearly inferior in heat resistance.

While the invention has been described in detail and with reference to specific embodiments thereof, it will be apparent to one skilled in the art that various changes and modifications can be made therein without departing from the spirit and scope thereof.

What is claimed is:

1. A process for producing a chloroprene elastomer having excellent heat aging resistance, which comprises copolymerizing in the presence of a radical catalyst a mixture consisting of 80 to 95 parts by weight of 2-chlorobutadiene-1,3 containing less than 0.95% by weight of 1-chlorobutadiene-1,3 with 5 to 20 parts by weight of 2,3-dichlorobutadiene-1,3 at a polymerization temperature of not higher than 20° C in the presence of a mercaptan compound.

2. The process of claim 1, wherein said 2-chlorobutadiene-1,3 contains less than 0.5% by weight of 1-chlorobutadiene-1,3.

3. The process of claim 1, wherein said polymerization temperature is not higher than 10° C.

4. The process of claim 3, wherein said polymerization temperature is not higher than 5° C.

5. The process of claim 1, wherein said mercaptan is an aliphatic mercaptan or an aromatic mercaptan.

6. The process of claim 5, wherein said aliphatic mercaptan is n-dodecylmercaptan or t-dodecylmercaptan and said aromatic mercaptan is thiophenol or thioxylenol.

7. The process of claim 1, wherein the amount of said mercaptan ranges from 0.05 to 2 parts by weight per 100 parts by weight of the total amount of the 2-chlorobutadiene-1,3 and the 2,3-dichlorobutadiene-1,3.

8. The process of claim 1, wherein said radical catalyst is a water-soluble catalyst or an oil-soluble catalyst.

9. The process of claim 8, wherein said catalyst is potassium persulfate, ammonium persulfate, hydrogen peroxide, t-butyl hydroperoxide, azobisisobutyronitrile, benzoyl peroxide, cumene hydroperoxide, p-menthane hydroperoxide, or diisopropyl peroxydicarbonate.

10. The process of claim 1, wherein said copolymerizing is an emulsion copolymerizing or a solution copolymerizing.

11. A process for producing a vulcanized chloroprene rubber having excellent heat aging resistance, which comprises copolymerizing in the presence of a radical catalyst a mixture consisting of 80 to 95 parts by weight of 2-chlorobutadiene-1,3 containing less than 0.95% by weight of 1-chlorobutadiene-1,3 with 5 to 20 parts by weight of 2,3-dichlorobutadiene-1,3 at a polymerization temperature of not higher than 20° C in the presence of a mercaptan compound to produce a chloroprene elastomer, preparing a rubber compounding of the chloroprene elastomer, and vulcanizing the rubber compounding.

* * * * *